United States Patent
Margulieux

(10) Patent No.: US 6,868,375 B1
(45) Date of Patent: Mar. 15, 2005

(54) EMULATION OF DYNAMICALLY RECONFIGURABLE COMPUTER SYSTEM

(75) Inventor: Gordon Margulieux, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

(21) Appl. No.: 09/680,544

(22) Filed: Oct. 4, 2000

(51) Int. Cl.[7] .............................................. G06F 9/455
(52) U.S. Cl. ........................... 703/25; 703/21; 714/29; 717/134; 717/138
(58) Field of Search ............................. 703/21, 23–25; 710/62; 711/1; 714/28, 29; 717/134, 138

(56) References Cited

U.S. PATENT DOCUMENTS

| | | | | |
|---|---|---|---|---|
| 5,383,137 A | * | 1/1995 | Burch ........................ | 703/23 |
| 5,430,855 A | * | 7/1995 | Walsh et al. ................ | 710/10 |
| 5,539,901 A | * | 7/1996 | Ramirez ..................... | 703/28 |
| 5,751,942 A | * | 5/1998 | Christensen et al. ......... | 714/38 |
| 5,768,563 A | * | 6/1998 | Porter et al. ................ | 703/27 |
| 5,887,145 A | * | 3/1999 | Harari et al. ............... | 710/301 |
| 5,915,106 A | * | 6/1999 | Ard ........................... | 703/23 |
| 5,953,516 A | * | 9/1999 | Bonola ....................... | 703/24 |
| 6,002,864 A | * | 12/1999 | Heyman ...................... | 703/23 |
| 6,571,305 B1 | * | 5/2003 | Engler ........................ | 710/100 |
| 6,684,182 B1 | * | 1/2004 | Gold et al. .................. | 703/8 |

FOREIGN PATENT DOCUMENTS

JP         04317138 A   * 11/1992   ............ G06F/11/22

* cited by examiner

Primary Examiner—Anthony Knight
Assistant Examiner—Crystal J Barnes

(57) ABSTRACT

The present invention relates to a system and method for emulating a greater range of behavior of a peripheral device connected to a host device or host computer than was available in the prior art. The emulation of a greater range of activity of the peripheral device provides an opportunity to more fully test the interaction of a host device with the emulated peripheral device. More specifically, the present invention preferably adds control data line and power data line connections to user data line connections between the host device and an intelligent emulator so that variations in control settings and power levels may be exercised in addition to manipulation of transmissions along a user data line, thereby more fully exercising host device interaction with an emulated device.

14 Claims, 3 Drawing Sheets

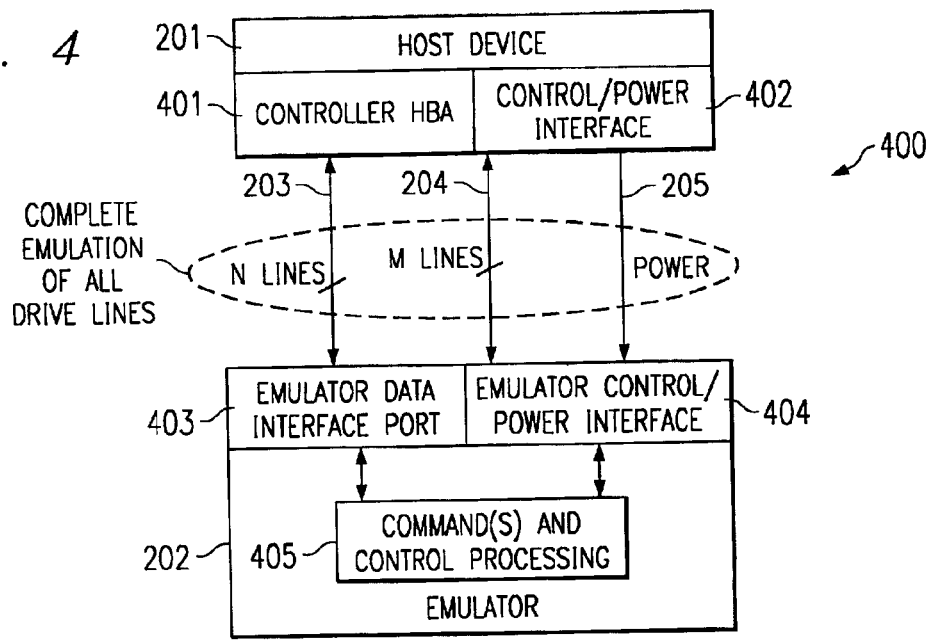
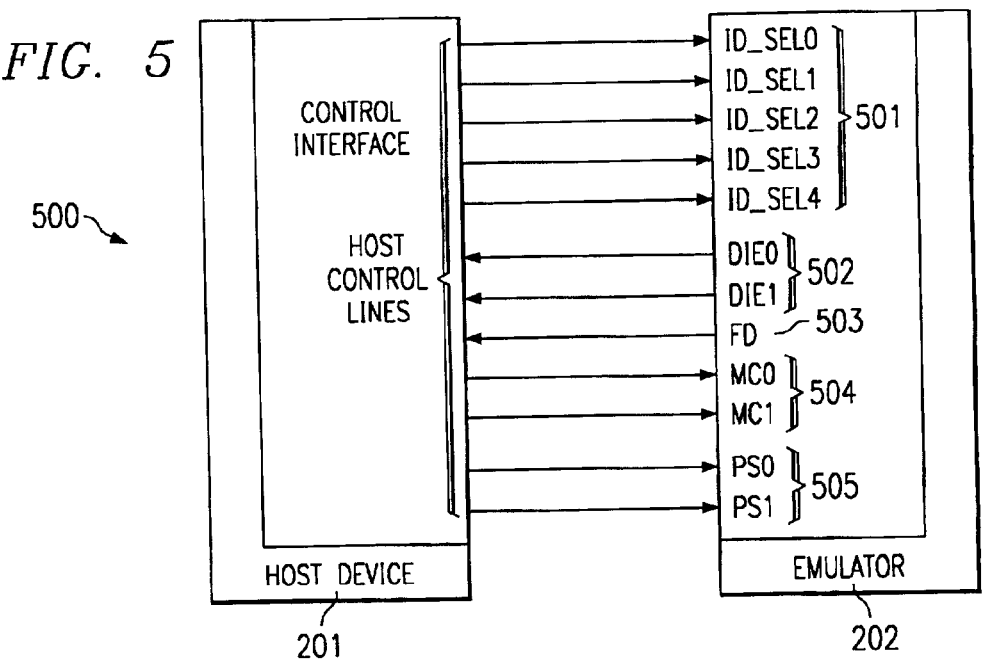

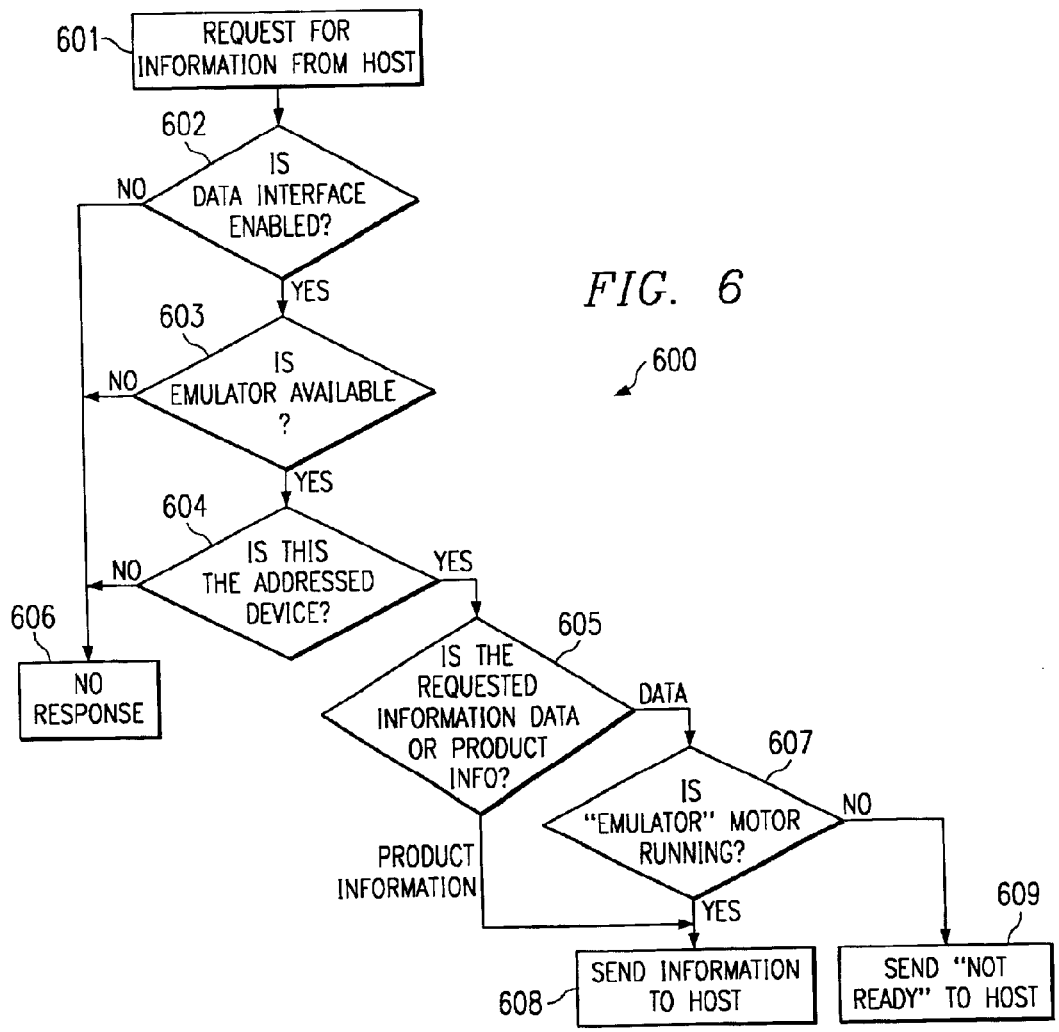

EMULATION OF DYNAMICALLY RECONFIGURABLE COMPUTER SYSTEM

RELATED APPLICATIONS

The present application is related to pending, commonly assigned, U.S. patent application Ser. No. 09/680,545, filed Jun. 3, 2004, entitled "PERSISTENT EMULATED DATA STORAGE USING EXTERNAL STORAGE IN TARGET MODE DISK EMULATOR" which is incorporated herein by reference.

TECHNICAL FIELD

The present invention relates in general to peripheral device emulation and in particular to including emulation of control and power circuitry in peripheral device emulation.

BACKGROUND

When constructing data processing or communication equipment, it is generally desirable to emulate the operation of various components and the interaction of these components with each other before all such components are available for actual physical testing. Such emulation generally enables the identification of potential fault conditions to be identified and the exercise of software within host devices designed to identify and respond to fault conditions originating within peripherals or other devices.

Generally, prior art systems are able to emulate data communication between the host and its peripheral devices occurring under steady state conditions. This may be accomplished by connecting data communication wiring or cabling between the host and emulator and causing the host equipment to communicate with the emulating device or emulator. Generally, the emulator is intended to operate, from the vantage point of the host device, just as though it were the device being emulated. The emulator generally emulates operation of a selected device under conditions wherein control signal conditions and power connections to the device being emulated are fixed throughout an emulation session.

FIG. 1 depicts an apparatus for conducting emulation of a peripheral device according to a prior art solution. Host device or host computer 101 is shown connected to emulator 102 by data connection 103. Any variation in the control settings and power settings of a device being emulated by emulator 102 is generally established by emulator 102 itself.

While the prior art solution may effectively emulate operation of the data connection between host computer 101 and emulator 102, the prior art setup of FIG. 1 will generally not allow host computer 101 to respond to variations in control settings and power conditions within emulator 102 as host device 101 will generally have no information pertaining to such control settings and power conditions.

Accordingly, the prior art emulation approach eliminates an entire category of testing of apparatus 100. For example, any effects of power-up or power-down operations within emulator 102 will generally not be discernible to host computer 101. Accordingly, host computer 101 will generally not be able to determine how fault detection and recovery software, which may be present in host computer 101, would respond to such power cycling operations.

Accordingly, it is a problem in the art that emulation generally does not enable host devices to determine or measure control settings and power conditions present in an emulator.

It is a further problem in the art that if a change in a control setting or power condition for an emulated device causes a disruption in data communication, the host computer will generally not be able to determine a cause of such disruption.

It is a further problem in the art that host device fault detection and recovery software will generally not be fully exercised in prior art emulation systems.

SUMMARY OF THE INVENTION

The present invention is directed to a system and method which incorporate control and power connections between a host computer or host device and an emulator to more fully exercise the operation of the host device connected to an emulated device. While physical connections may be implemented between the host computer and the emulator to emulate actual power and control data lines between the host computer and a real peripheral device, programs are preferably included in the operation of the emulator to provide an appropriate response to the host device based on a likely response of the device being emulated, as calculated by algorithms included in the emulator software.

In a preferred embodiment, deployment of a power data line connection between the host computer and a peripheral may be used to detect the physical presence or absence of a peripheral device at a point of connection to a host device. Use of the power data line connection may be limited to such mere presence detection where the peripheral device being emulated is powered separately from the host computer. However, alternatively, the emulator may receive data representing power values along a power data line connection, thereby enabling the host device to both control and monitor a level of emulated power transmission to a device being emulated by the emulator.

An increasing number of applications, particularly those in high availability computer storage systems employ some form of "hot plug" or dynamic removal and replacement capability for disk drives or other storage systems within a computer system. Such hot plug replacement of system components generally involves connecting and removing disk drives to and from computer systems without powering down the overall computer system. A system for emulating the operation of such a system would preferably include a mechanism for emulating the operation of control and power data lines, as well the effects of abrupt connection and disconnection of power data lines to a data storage device on data communication between a host device and the data storage device or other peripheral device. Preferably, employing the inventive system and method, an emulated peripheral device may be caused to appear and disappear dynamically at selected ports of a host device.

Herein, "control data" generally refers to information representing control commands, address values, messages, data, and/or system settings, any of which may be static or dynamic, and which may be transmitted along a control data communication line, "power data" preferably includes information representing power levels to be supplied to an emulated device, "operational data" generally refers to data including control data and/or power data, and "user data" generally refers to data stored within storage devices such as disk drives, wherein the content of such user data is generally not used to establish a control setting or power value within an emulated device or computer system.

In a preferred embodiment, the host device may transmit control data along control data line connections between the host device and peripheral device and check for proper operation of the emulator software, as well as the host device software, in response to selected commands. An example is presented in which the host device issues a command to identify a particular peripheral device as disk drive number 5, and subsequently transmits data along a user data line connection having a destination address of disk drive number 4.

In this case, the emulator would generally respond with an error message indicating that it is unable to process a request to store the transmitted data since the "disk drive number 4" has been reached in error. Alternatively, the emulated device may simply not respond at all, at which time the host device would generally "time out" while waiting for a response.

In a preferred embodiment, deployment of a power data line between the host device and emulator enables emulation of a selected device within the emulator during transient power conditions to be emulated by the inventive system. The inventive approach preferably enables the host device to monitor data traffic on the data communication line occurring during simulated power-up or power-down of the emulator. Appropriate effects on the data communication line caused by power-up and power-down conditions within the emulator are preferably implemented by software included in the emulator. Producing appropriate effects and/or disturbances in the data communication line in response to power cycling conditions preferably enables the host computer to fully exercise diagnostic and recovery operations implemented in the code within the host device. In this manner, the features of the host system may preferably be more fully exercised than when employing systems of the prior art.

Moreover, the emulator may used in such a way as to permit emulation of dynamic connection and disconnection of a peripheral device where the behavior of the pertinent peripheral device under transient power conditions is known. The practice of peripheral device dynamic connection and disconnection is referred to herein as "hot plug" operation.

Accordingly, it is an advantage of a preferred embodiment of the present invention that the host device is able to monitor and establish the control and power settings for an emulated device employing control and power connection lines of the present invention.

It is a further advantage of a preferred embodiment of the present invention that diagnostic and recovery functionality within the host device may be more fully exercised than in prior art systems.

It is a still further advantage of a preferred embodiment of the present invention that dynamic connection and disconnection of peripheral devices to a host device may be practiced employing information pertaining to transient power characteristics of various peripheral devices.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 depicts apparatus for use in interfacing an emulator to a host device according to a preferred embodiment of the present invention;

FIG. 5 depicts a control interface connection between a host device and an emulator according to a preferred embodiment of the present invention;

FIG. 6 depicts an example of logic flow during a device emulation according to a preferred embodiment of the present invention; and FIG. 7 depicts computer apparatus adaptable for use with a preferred embodiment of the present invention.

DETAILED DESCRIPTION

Figure 1:
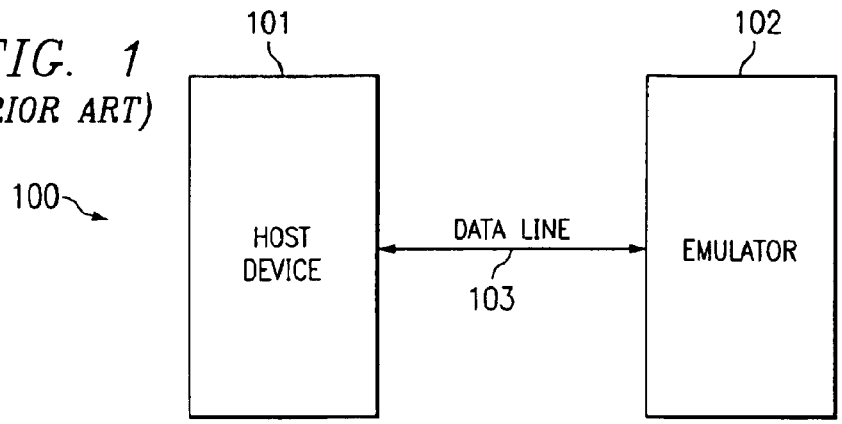
FIG. 1 depicts apparatus for conducting emulation of a peripheral device according to a prior art solution.
Figure 2:
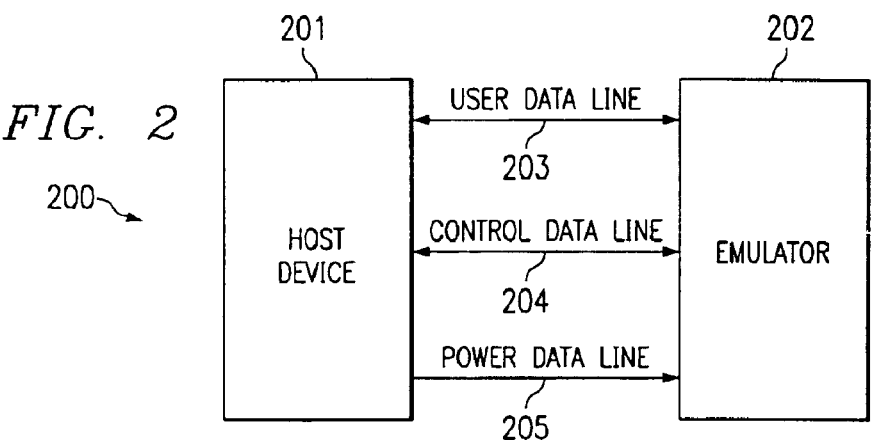
FIG. 2 depicts apparatus for connecting a host device to an emulator according to a preferred embodiment of the present invention.

FIG. 2 depicts an apparatus 200 for connecting a host device to an emulator according to a preferred embodiment of the present invention. The embodiment of FIG. 2 preferably operates to enable more accurate emulation of various peripheral devices emulated by emulator 202 than was possible employing the systems of the prior art. This more accurate emulation is preferably made possible by more accurately representing the physical interface between the host device 201 and a hypothetical peripheral device by employing a plurality of connection lines between the host device 201 and emulator 202. Although the embodiment of FIG. 2 depicts three such connection lines, it will be appreciated that fewer or more than three such connection lines may be employed, and that all such variations are included within the scope of the present invention. Although the following discussion generally concerns an embodiment in which host device 201 is connected to a single emulator 202, where emulator 202 emulates a single device, it will be appreciated that multiple emulators may be connected to host device 201, and multiple peripheral devices could be emulated by any single emulator, and all such variations are included in the scope of the present invention.

In a preferred embodiment, user data line 203 preferably provides bi-directional data communication between host device or host computer 201 and emulator 202. In addition to user data line 203, the embodiment of FIG. 2 preferably provides control data line 204 and power data line 205. It will be appreciated that one or more of each of user data line 203, control data line 204, and power data line 205 may be implemented. Moreover, the present invention may incorporate connection lines for purposes other than those described in connection with lines 203, 204, and 205.

A plurality of different devices and device types may be emulated by emulator 202, including, but not limited to, disk drives, tape drives, other storage media, input/output (I/O) devices, processors, fans and other electromechanical components preferably having data interfaces. Preferably, a common set of data, control, and power data lines may be employed between host device 201 and emulator 202 for the purpose of emulating a range of different physical devices. Each emulation process will preferably involve deploying software within both host device 201 and emulator 202 appropriately suited to the device being emulated. For example, the behavior profiles of an I/O device and a hard disk drive during power-up and power-down conditions may vary. Software implemented in the emulator for these two cases of emulation preferably accurately reflects the behavior of the devices being emulated under their respective actual operating conditions.

In a preferred embodiment, control data line 204 may be employed to control settings including but not limited to: designation of address destinations, identification of address locations as well as data interface lines employed to enable the interface. For example, host device 201 may transmit a data location identifier to emulator 202 along control data line 204 which preferably remains active throughout a particular emulation session unless modified by host device 201. Establishing such a setting may cause changes in the operation of one or more of the other lines 203 and 205 connecting host device 201 and emulator 202.

For example, where emulator 202 emulates a disk drive, host device 201 may transmit a message along control data line 204 to designate the emulated disk drive as disk drive number 4. Continuing with the example, a data message is subsequently transmitted along user data line 203 from host device 201 to emulator 202 within a data packet indicating that the intended destination address for the data is disk drive number 5. In this case, emulation software within emulator 202 preferably does not store the data and may optionally return an error condition to the host device 201. Alternatively, the emulation software may simply not respond at all, thereby causing a time-out condition in host device 201. In this example, it may be seen that messages transmitted along control data line 204 may affect communication occurring along user data line 203. Whether the emulator's response is to send an error message or to not respond at all, the operation of the host device in response to an improperly directed message, in the emulation environment, may be fully exercised. The response of host device 201 may include execution of diagnostic and/or recovery code.

In a preferred embodiment, power data line 205 may include a range of operations, depending upon which device is being emulated. Generally, emulator 202 receives its actual operating power independently of power data line 205. Thus, in a preferred embodiment, power data line 205 is generally not employed to supply operating power to emulator 202. Rather, power data line 205 is preferably a data communication line which transmits data which emulates various power data line conditions for a device being emulated by emulator 202. It will be appreciated that some of the devices being emulated may ordinarily receive their power from host device 201, while others may be powered independently of host device 201 but conduct data and control data line communication with host device 201.

For example, where emulator 202 is emulating a device normally powered by host device 201, host device 201 preferably transmits data messages along power data line 205 which represent power levels for the emulated device. During steady state operation, host device 205 may transmit a power value to emulator 202 representing a power value to be supplied to the emulated device. Upon receipt of this power value, software within emulator 202 preferably operates to establish the transmitted power value as the operating power level for the emulated device. The emulated behavior of the device preferably responds to the established power value according to the characteristics of the emulation program within emulator 202. Under more complex power cycling conditions, a series of power values, which may vary rapidly as a function of time, are preferably transmitted from host device 201 to emulator 202 for input to an appropriate program running within emulator 202. As is the case with a steady state power value, the operation of the emulated device then preferably follows the characteristics of the emulated device incorporated into the emulation program within emulator 202.

In a preferred embodiment, the software in emulator 202 also preferably accurately emulates the effects on user data line 203 and control data line 204 of transient power conditions on power data line 205. For example, where the presence of transient power conditions on power data line 205 would normally cause random or "noise" data to appear on a peripheral device data communication line, emulator 202 software preferably causes such data to appear on user data line 203 to accurately represent the operation of the device being emulated. The above example illustrates but one example of the effect of one communication line upon another, in this case, an effect of a power state upon user data line 203. It will be appreciated that many other such interrelationships may exist between the data transmitted along communication lines 203–205.

A more limited operation of power data line 205 may include merely sensing the presence or absence of a device at the emulator 202 end of power data line 205. This more limited operation of power data line 205 may be employed where the peripheral device being emulated is powered by a source independent of host device 201. While the above discussion concerns an arrangement in which host device 201 supplies data along power data line 205 to emulator 202, which represents power values. In an alternative embodiment, host device 201 could supply actual operating power to emulator 202.

In a preferred embodiment, host device 201 and emulator 202 may each be any one of a number of intelligent processing devices. The operations of host device 201 may be performed by a personal computer but, alternatively, may be performed by any one of a number other computing devices. Likewise, emulator 202 may be a personal computer, but could also be any one of number of other computing devices having appropriate processing power and one or more data communication interfaces for communication with host device 201. It will be appreciated that host device 201 and/or emulator 202 may comprise more than one data processing device, and all such variations are included within the scope of the present invention.

Figure 3:
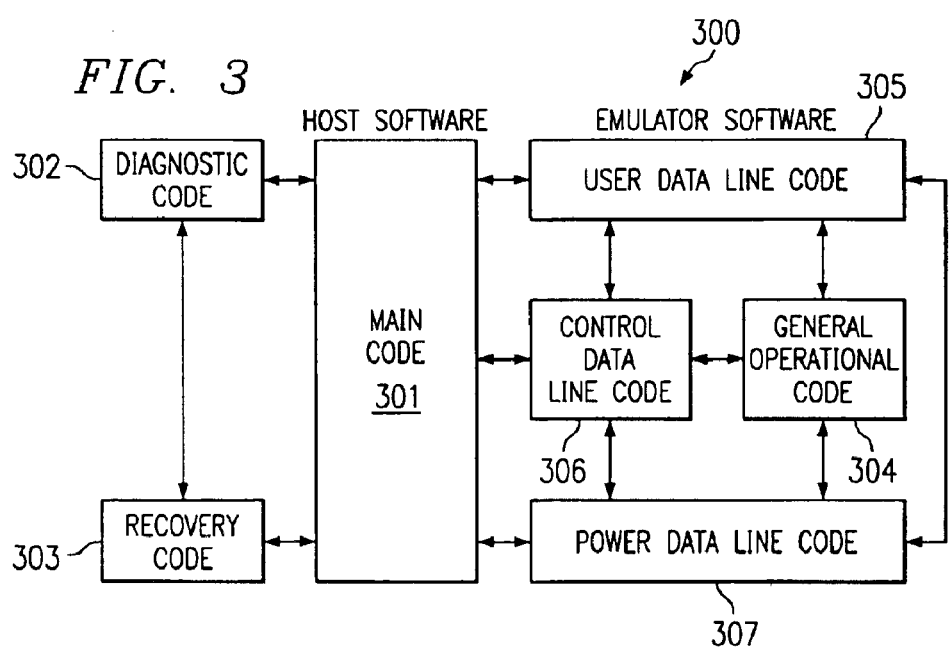
FIG. 3 is a block diagram representing interaction between various software elements according to a preferred embodiment of the present invention.

FIG. 3 is a block diagram 300 representing interaction between various software functions according to a preferred embodiment of the present invention. It will be appreciated that fewer or more operational software blocks could be included in the emulation of a peripheral device by a host device, and all such variations are included in the scope of the present invention.

In a preferred embodiment, program code is implemented which includes the various functional blocks depicted in FIG. 3. Herein, "host software" generally refers to software implemented within host device 201 (FIG. 2) and "emulator software" generally refers to software implemented within emulator 202 (FIG. 2) for emulating the operation of a selected peripheral device and interacting with communication interfaces between emulator 202 and host device 201.

In a preferred embodiment, host software includes main code 301 which operates user data line 203, control data line 204, and power data line 205 communication with emulator 202. Where appropriate, main code 301 may call diagnostic code 302 and/or recovery code 303. Diagnostic code 302 is preferably executed when a fault condition is indicated in order to determine a cause of such fault. Where beneficial, recovery code 303 may be called to correct errors or problems caused by a fault condition or other cause. The arrows between functional blocks in FIG. 3 generally indicate the availability of bi-directional communication between such blocks. Generally, each block at an end of a bi-directional arrow is able to influence the operation of the block at the other end of the arrow.

In a preferred embodiment, emulator software preferably includes code for executing operations associated with each of user data line 203, control data line 204, and power data line 205, designated respectively, as user data line code 305, control data line code 306, and power data line code 307. In each case, blocks 305–307 preferably operate to execute operations associated with data, both incoming and outgoing, with their respective communication lines. Preferably, general operational code 304 executes functions representing the general operation of a device being emulated by emulator 202 (FIG. 2). The features of general operational code 304 will preferably vary depending upon the device being emulated.

FIG. 4 depicts an apparatus 400 for use in interfacing an emulator to a host device according to a preferred embodiment of the present invention. FIG. 4 includes some of the same features depicted in FIG. 2, such as host device 201, emulator 202, and the data, control, and power data lines. However, FIG. 4 depicts certain preferred interfacing components for implementing the inventive set of connections between host device 201 and emulator (or, target mode emulator) 202. In a preferred embodiment, host device 201 may be implemented as part of a high availability storage system. Alternatively, host device 201 may be associated with a number of other data processing applications.

In a preferred embodiment, host device 201 includes a controller host bus adapter (HBA) 401 for interfacing with user data line 203 and a control/power interface 402 for interfacing host device 201 with control data line 204 and power data line 205. Generally, each of user data line 203, control data line 204, and power data line 205 may include a plurality of physical wires. One possible implementation of control/power interface 402 would involve deployment of a general purpose interface card (GPIO card). Alternatively, a number of other interface cards, either general purpose or custom, may be employed, and all such variations are included within the scope of the present invention.

In a preferred embodiment, controller HBA 401 of host device 201 transmits data along user data line 203 to emulator data interface port 403 of emulator 202. Separately, control/power interface 402 of host device 201 preferably conducts communication along control data line 204 and power data line 205 with emulator control/power interface 404 within emulator 202. While the embodiment of FIG. 3 is shown employing a single device in each of host device 201 and emulator 202 for interfacing each of the devices with control data line 204 and power data line 205, it will appreciated that an alternative embodiment could employ a separate interface in each of the host device 201 and emulator 202 for interacting with each of control data line 204 and power data line 205.

In a preferred embodiment, data received at emulator data interface port 403 and emulator control/power interface 404 is fed into the "command and control processing" functional block 405. Preferably, software operation within command and control processing block 405 performs operations employing data received from interfaces 403 and 404 and generates responses to be transmitted back toward host device 201 along user data lines 203 and control data line 204. Although the preferred embodiment depicted in FIG. 3 depicts uni-directional communication from host device 201 to emulator 202 for power data line 205, an alternative embodiment of the present invention could deploy bi-directional communication along power data line 205.

In a preferred embodiment of the present invention, manipulation of data on the control data line may be beneficially employed to emulate the attachment of peripheral devices to different ports on host device 201. Specifically, an address for a device being emulated may be initially established to correspond to a first port by sending appropriate data along control data line 204. Once testing of the emulated device at the first port is completed, the host device may establish new address data corresponding to a second port connection for the device being emulated by transmitting appropriate data along control data line 204 to emulator 202. By repeating this process, host device 201 is preferably able to conduct several tests of a particular emulated device, with the emulated device having a different emulated port connection for each test.

The above-described approach thereby preferably enables efficient, rapid, and programmable modification of emulated peripheral device attachment to the host device. Preferably, when changing port connections for a particular emulated peripheral device, physical removal and re-attachment of the peripheral device to the host device is preferably also emulated. This removal and re-attachment may be emulated by transmitting appropriately adjusted power values from host device 201 to emulator 202 to reflect the loss and subsequent restoration of power to the peripheral device.

FIG. 5 depicts a control interface connection 500 between host device 201 and emulator 202 according to a preferred embodiment of the present invention. FIG. 5 depicts one possible selection of control interface connections which may be implemented within control data line 204 and power data line 205 (FIG. 2). It will be appreciated that fewer or more connections may be established, and that connections other than those shown in FIG. 5 may be implemented within control data line 204, and all such variations are included within the scope of the present invention.

In a preferred embodiment, ID select lines 0–4 501 are interface lines which establish address values for a device being emulated. Communication along ID select lines 501 is generally uni-directional from host device 201 to the emulator 202. However, in an alternative embodiment, ID select lines 501 could conduct bi-directional communication. DIE 0 and DIE 1 are preferably data interface enable lines 502 and preferably conduct uni-directional communication from emulator 202 to host device 501. FD or fault detect line 503 preferably conducts unidirectional communication from emulator 202 to host device 201.

In a preferred embodiment, motor control data lines 504, or MCO and MCI, conduct uni-directional communication from host device 201 to emulator 202. Where, for example, the device being emulated is a disk drive, motor control data lines 504 preferably enable host device 201 to activate or deactivate the motors within the disk drives. Since running the motors within disk drives consumes a significant amount of energy, and selected disk drives are not continuously in use, substantial energy savings may be obtained by turning off the motors in selected drives when the drives are not in use. Power supply lines 505, or PS0 and PS1, preferably support unidirectional communication from host device 201 to emulator 202. Power supply lines or power supply detection lines 505 may be employed to indicate to host device 201 whether emulator 202 is connected to and/or available to host device 201.

Where the device being emulated is a disk drive or storage mechanism having an active communication interface, various types of communication may be conducted. One basic type of communication involves user data actually stored on a disk within the disk drive. In order for host device 201 to retrieve this type of data from a disk drive, or emulated disk drive, the disk drive motor should be spinning. Thus, certain steps are generally pursued, such as issuing a command along control data line 204 to turn on the disk drive motor in order to retrieve the data stored on the disk itself. Other data may be retrieved from a disk drive or other storage device which does not require that the disk drive motor be spinning. For example, communication pertaining to the identity and status of the drive, which is generally independent of data stored on the drive, may preferably be conducted between host device 201 and the disk drive without activating the disk drive motor. Accordingly, the features of the control data line communication between host device 201 and emulator 202 (which may emulate a wide range of devices) are preferably adjusted to suit the characteristics of the device being emulated.

FIG. 6 depicts an example of logic flow 600 during a device emulation according to a preferred embodiment of the present invention. The logic flow 600 depicted in FIG. 6 generally assumes that the device being emulated has a motor or other analogous active electro-mechanical device. Reference may be made to FIG. 2 in connection with the mention of host device 201 and emulator 202.

In a preferred embodiment, an exchange of information may be initiated by sending a request for information from host device 201 to emulator 202, in step 601. Execution of this step generally requires that emulator 202 (which may be a target mode emulator) is turned on and connected to host device 201.

At step 602, host device 201 preferably determines whether a data interface on emulator 202 is enabled by checking DIE lines 502 (FIG. 5). If the data interface is not enabled, generally no response will be provided by host 201, as indicated in step 606. If the data interface is enabled, host device 201 preferably determines whether emulator 202 is available and connected by checking power supply detection line 505, step 603. If emulator 202 is not available, a response will generally not be provided by host device 201, as indicated in step 606. If emulator 202 is available, the host device preferably proceeds to determine the identity of the device being emulated.

At step 604, the host device preferably determines whether the emulated device with which it is communicating is the correct device. This determination may be made by retrieving an address from the emulated device and comparing this retrieved address with an address at which host device 201 expected the emulated device to be located. If the wrong device is in communication with the host device, a response by host device 201 will generally not be provided, as indicated in step 606.

If the correct device is being addressed by host device 201, the inventive mechanism then determines whether host device 201 seeks user data or product identification information, step 605. (Herein, "user data" generally refers to data stored on a hard disk drive or other storage device as opposed to overhead data which describes the identity and location of the disk drive or other emulated device). If the requested information in product information, which generally does not require activating a disk drive motor or otherwise delving into user data storage within an emulated storage device, then the product information is returned to host device 201 at step 608. If the requested information is user data, the inventive mechanism then determines the status of the disk drive or other storage device motor at step 607. In an emulation environment, the status of the "motor" or storage device active mechanism is generally a bit or flag established by software operating within emulator 202 as opposed to a condition of an actual physical device.

If the storage device active mechanism or motor is running, emulator 202 preferably acquires the data from the disk or other storage format and transmits this acquired data to host device 201 in step 608. If the storage device active mechanism or motor is not running, in step 607, emulator 202 preferably transmits a "not ready" signal to host device 201 in step 609 to indicate that it is not currently able to satisfy the request for data initiated in step 601. In the above, the responses to host device 201 from emulator 202 are generally handled by the command and control processing functional block 405 (FIG. 4) within emulator 202.

FIG. 7 illustrates computer system 700 adaptable for use with a preferred embodiment of the present invention. Central processing unit (CPU) 701 is coupled to system bus 702. CPU 701 may be any general purpose CPU, such as an HP PA-8200. However, the present invention is not restricted by the architecture of CPU 701 as long as CPU 701 supports the inventive operations as described herein. Bus 702 is coupled to random access memory (RM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) adapter 705, communications adapter card 711, user interface adapter 708, and display adapter 709. I/O adapter 705 connects to storage devices 706, such as one or more of hard drive, CD drive, floppy disk drive, tape drive, to the computer system. Communications adapter 711 is adapted to couple computer system 700 to network 712, which may be one or more of local (LAN), wide-area (WAN), Ethernet or Internet network. User interface adapter 708 couples user input devices, such as keyboard 713 and pointing device 707, to computer system 700. Display adapter 709 is driven by CPU 701 to control the display on display device 710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for emulating an operation of a dynamically reconfigurable computer system, the method comprising:

emulating a storage drive with an emulator;

providing operational data communication between a host device and the emulator;

employing said provided operational data to control an operation of the emulated storage drive at said emulator; and providing user data communication between said host device and said emulator;

wherein said providing operational data comprises establishing a power level for said operation of said emulated storage drive.

2. The method of claim 1 wherein said providing operational data communication comprises:

dynamically detecting a connection of said emulator to said host device.

3. The method of claim 1 wherein said providing operational data communication comprises:

enabling control at least one component within said emulated storage drive by said host device.

4. The method of claim 1 further comprising:

adjusting the operation of said emulated storage drive according to said established power level.

5. The method of claim 4 wherein said adjusting comprises comprising:

adjusting said provision of user data communication between said host device and said emulator according to said established power level.

6. The method of claim 1 wherein said providing operational data comprises:

dynamically modifying said established power level to emulate one of a connection and a disconnection of a power attachment for said emulated storage drive.

7. The method of claim 6 further comprising:

continuously adjusting the operation of said emulated storage drive based upon said dynamically modified established power level.

8. The method of claim 7 wherein said continuously adjusting comprises:

discontinuing provision of user data communication when upon occurrence of said disconnection of said power attachment to said emulated storage drive.

9. A method for emulating an operation of a dynamically reconfigurable computer system, the method comprising:

emulating a storage drive with an emulator;

providing operational data communication between a host device and the emulator; and employing said provided operational data to control an operation of the emulated storage drive at said emulator;

wherein said providing operational data communication comprises establishing an address at said host device to which said emulated storage drive is connected.

10. The method of claim 9 wherein said providing operational data communication comprises:

modifying said established address at said host device to which said emulated storage drive is connected.

11. A method for emulating an operation of a dynamically reconfigurable computer system, the method comprising:

emulating a storage drive with an emulator;

providing operational data communication between a host device and the emulator; and employing said provided operational data to control an operation of the emulated storage drive at said emulator;

wherein said providing operational data communication comprises providing a fault detect signal to said host device to indicate a fault condition within said emulated storage drive.

12. A system for emulating an operation of a peripheral device, the system comprising:

a host device;

an emulator connected to said host device;

at least one control data line deployed between said host device and said emulators; and at least one power data line deployed between said host device and said emulator;

wherein said at least one power data line includes a power supply line for dynamically detecting a connection of said emulator to said host device.

13. The system of claim 12 wherein said at least one control line comprises:

a motor control line for activating a component within a device emulated by said emulator.

14. A computer program product having a computer readable medium having computer program logic recorded thereon for emulating an operation of a dynamically reconfigurable computer system, the computer program product comprising:

code for providing operational data communication between a host device and an emulator;

code for employing said provided operational data to control an operation of an emulated device at said emulator;

code for conducting user data communication between said host device and said emulator in accordance with contents of said operational data;

wherein said code for providing operational data includes code for establishing a power level for said operation of said emulated device; and wherein said code for providing operational data includes code for dynamically modifying said established power level to emulate one of a connection and a disconnection of a power attachment to said emulated device.

* * * * *